US012743341B2

(12) United States Patent
Agrawal et al.

(10) Patent No.: US 12,743,341 B2
(45) **Date of Patent: *Sep. 22, 2026**

(54) DYNAMIC RESOURCE SCALING FOR LARGE-SCALE BACKUPS

(71) Applicant: Rubrik, Inc., Palo Alto, CA (US)

(72) Inventors: Rohit Agrawal, Santa Clara, CA (US); Prateek Pandey, Bangalore (IN); David Terei, Austin, TX (US); Ramya Thulasingam, Fremont, CA (US)

(73) Assignee: Rubrik, Inc., Palo Alto, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 19/040,722

(22) Filed: Jan. 29, 2025

(65) Prior Publication Data

US 2025/0173225 A1 May 29, 2025

Related U.S. Application Data

(63) Continuation of application No. 17/989,493, filed on Nov. 17, 2022, now Pat. No. 12,229,012.

(30) Foreign Application Priority Data

Sep. 27, 2022 (IN) ............................ 202241055345

(51) Int. Cl.
*G06F 11/1446* (2026.01)

(52) U.S. Cl.
CPC ...... *G06F 11/1451* (2013.01); *G06F 2201/84* (2013.01)

(58) Field of Classification Search
CPC ......................... G06F 11/1451; G06F 2201/84
USPC .......................................................... 707/645
See application file for complete search history.

(56) References Cited

U.S. PATENT DOCUMENTS

| | | | | |
|---|---|---|---|---|
| 7,467,267 | B1 * | 12/2008 | Mayock | G06F 11/1464 707/999.204 |
| 10,445,186 | B1 | 10/2019 | Vonthenen et al. | |
| 2005/0268068 | A1 * | 12/2005 | Ignatius | G06F 3/0613 711/202 |
| 2010/0077160 | A1 * | 3/2010 | Liu | G06F 11/1451 711/162 |
| 2012/0089572 | A1 * | 4/2012 | Raichstein | G06F 11/1461 707/645 |

(Continued)

*Primary Examiner* — Giovanna B Colan
(74) *Attorney, Agent, or Firm* — Holland & Hart LLP

(57) ABSTRACT

Methods, systems, and devices for data management are described. A data management system (DMS) may determine to generate a backup instance of an application that includes multiple user accounts. The DMS may identify a time window for generation of the backup instance based on a set of backup parameters associated with the application. The DMS may calculate respective runtime durations for the user accounts based on respective quantities of data objects in the user accounts and respective backup job types associated with the data objects. The DMS may determine respective values of a semaphore parameter based on the respective runtime durations and the time window, where the semaphore parameter defines a threshold quantity of data objects to be processed in parallel. The DMS may generate the backup instance of the application based on processing the user accounts in accordance with the respective values of the semaphore parameter.

20 Claims, 10 Drawing Sheets

(56) References Cited

U.S. PATENT DOCUMENTS

| | | | | |
|---|---|---|---|---|
| 2013/0262925 | A1* | 10/2013 | Dhanalakoti | G06F 11/1461 714/16 |
| 2014/0289333 | A1* | 9/2014 | Chan | H04L 63/08 709/204 |
| 2015/0046398 | A1* | 2/2015 | Camble | G06F 16/27 707/634 |
| 2016/0078537 | A1* | 3/2016 | Katsuyama | G06Q 40/04 705/37 |
| 2018/0314603 | A1* | 11/2018 | Gibbons, Jr. | H04L 67/1097 |
| 2019/0034285 | A1* | 1/2019 | Knechtel | G06F 11/1461 |
| 2020/0310921 | A1* | 10/2020 | Littlefield | G06F 11/1464 |
| 2021/0311837 | A1* | 10/2021 | Norwell | G06F 11/1451 |
| 2022/0229732 | A1* | 7/2022 | Chitloor | G06F 11/1451 |
| 2023/0205642 | A1* | 6/2023 | Yadav | G06F 11/1489 707/745 |
| 2023/0315581 | A1* | 10/2023 | Shuvalov | G06F 11/1464 707/654 |

* cited by examiner

Figure 9:
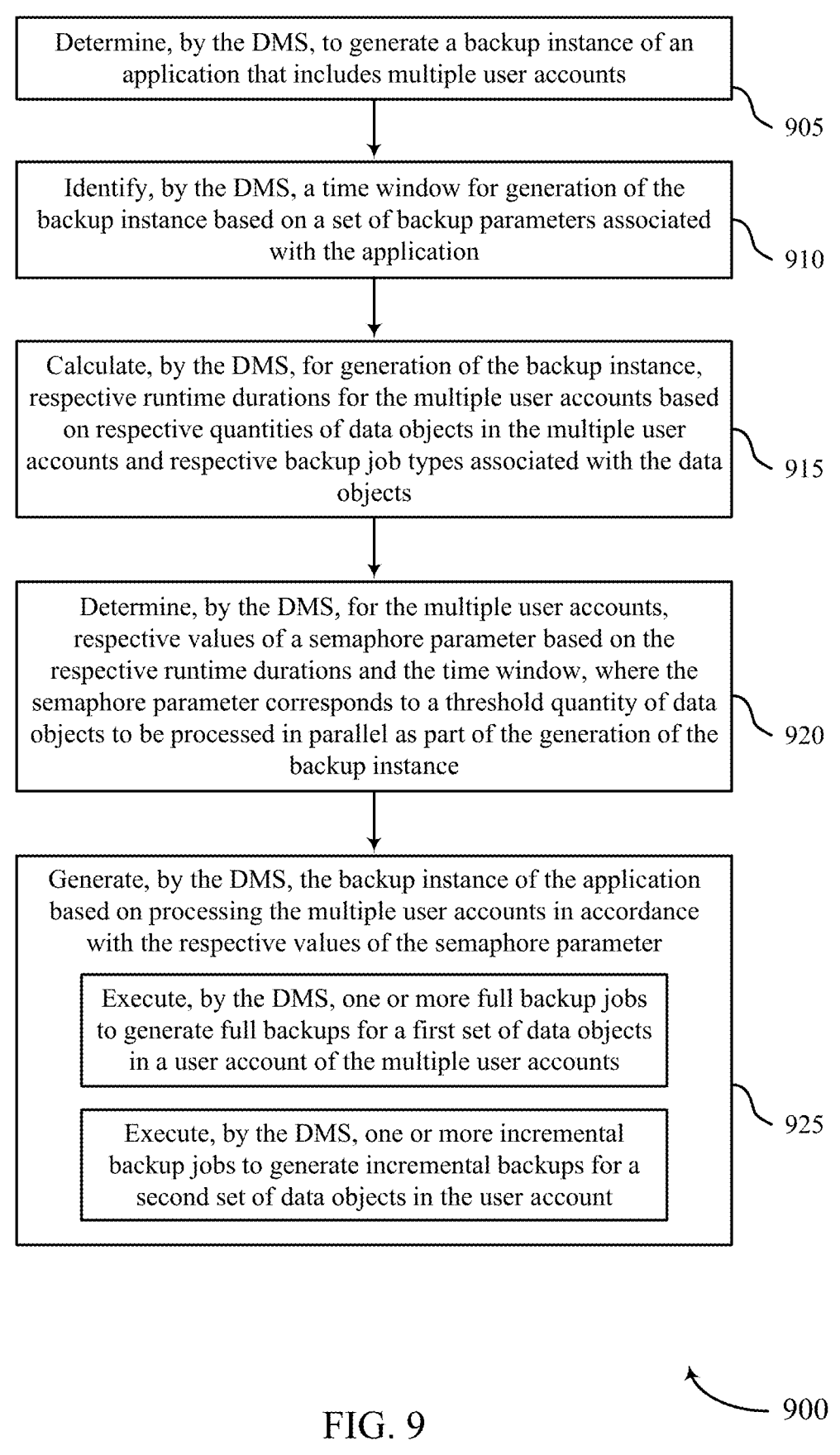

Determine, by the DMS, to generate a backup instance of an application that includes multiple user accounts

905

Identify, by the DMS, a time window for generation of the backup instance based on a set of backup parameters associated with the application

910

Calculate, by the DMS, for generation of the backup instance, respective runtime durations for the multiple user accounts based on respective quantities of data objects in the multiple user accounts and respective backup job types associated with the data objects

915

Determine, by the DMS, for the multiple user accounts, respective values of a semaphore parameter based on the respective runtime durations and the time window, where the semaphore parameter corresponds to a threshold quantity of data objects to be processed in parallel as part of the generation of the backup instance

920

Generate, by the DMS, the backup instance of the application based on processing the multiple user accounts in accordance with the respective values of the semaphore parameter Execute, by the DMS, one or more full backup jobs to generate full backups for a first set of data objects in a user account of the multiple user accounts Execute, by the DMS, one or more incremental backup jobs to generate incremental backups for a second set of data objects in the user account

DYNAMIC RESOURCE SCALING FOR LARGE-SCALE BACKUPS

RELATED APPLICATIONS

The present application is a Continuation of U.S. patent application Ser. No. 17/989,493, entitled "DYNAMIC RESOURCE SCALING FOR LARGE-SCALE BACKUPS" and filed Nov. 17, 2022, which claims priority to Indian Patent Application No. 202241055345, entitled "DYNAMIC RESOURCE SCALING FOR LARGE-SCALE BACKUPS" and filed Sep. 27, 2022, each of which is assigned to the assignee hereof and each of which is expressly incorporated by reference herein.

FIELD OF TECHNOLOGY

The present disclosure relates generally to data management, and more specifically to dynamic resource scaling for large-scale backups.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

A DMS may provide backup and recovery services for various client systems and applications. In some cases, however, generating and maintaining backups of larger client applications may be cause backup compliancy issues, load balancing issues, resource scaling issues for the DMS, or any combination thereof, among other possible problems.

BRIEF DESCRIPTION OF THE DRAWINGS

FIGS. 8 through 10 show flowcharts illustrating methods that support dynamic resource scaling for large-scale backups in accordance with one or more aspects of the present disclosure.

DETAILED DESCRIPTION

Figure 1:
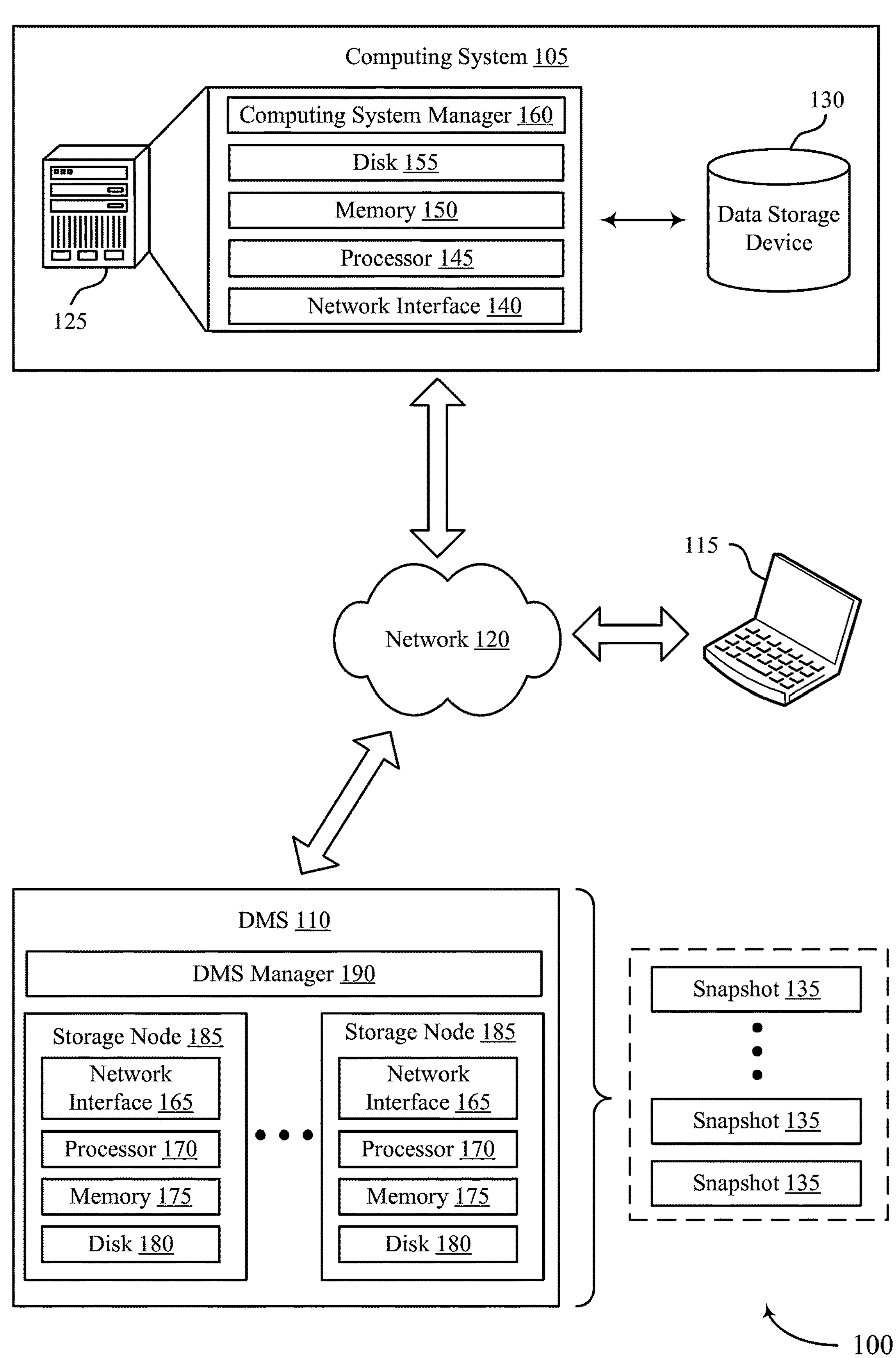
FIGS. 1 and 2 illustrate examples of computing environments that support dynamic resource scaling for large-scale backups in accordance with one or more aspects of the present disclosure.

A data management system (DMS) may provide backup, restore, archival, and duplication services for client systems and applications. To create a backup instance of a client application, the DMS may generate and store snapshots of user accounts associated with the client application. The snapshots (also referred to as backups) generated by the DMS may include a combination of full snapshots and incremental snapshots. As described herein, a full snapshot of a user account may include all data objects (emails, files, metadata) present in the user account at a first time, whereas an incremental snapshot may include all data objects that added, removed, or modified between the first time and a second (later) time. Thus, incremental snapshots may capture all changes made to the client application (users added, emails received, files deleted) within a given time period.

The frequency and type of backups generated by the DMS may be defined by a service-level agreement (SLA) between the DMS and a client system. For example, the SLA may indicate that the DMS is to take full snapshots of a client application every 24 hours and incremental snapshots of the client application every 4 hours. In some cases, however, creating a backup instance (also referred to as a snappable) of a relatively large client application that includes thousands of unique objects (e.g., accounts, emails, documents) may cause SLA compliance issues. For example, a backup instance of a relatively large client application may go out of compliance if the DMS is unable to generate a full backup of the client application in the allotted time window (e.g., 24 hours). Backing up large client applications may also result in computational resource overload, which could adversely affect the ability of the DMS to provide backup and recovery services to other client systems.

To improve the efficiency of generating and maintaining backups of larger client applications, a DMS may dynamically adjust one or more settings for a backup workload (e.g., a backup instance of a client application) based on the size and type of the backup workload. More specifically, the DMS may configure a semaphore parameter (which defines the number of backup jobs the DMS can execute in parallel) according to the relative size of a backup workload. For example, the DMS may estimate a backup workload size for a user account by iteratively scanning through all data objects in the user account. The DMS may use the estimated workload size in combination with historical information associated with previous client backups (e.g., the average duration of previous backup workloads for the client) to calculate an approximate total runtime for the backup workload. Accordingly, the DMS may determine a semaphore parameter (also referred to as a semaphore permit) such that the DMS can complete the backup workload in the requested timeframe (as defined by the SLA settings for the client).

For larger backup workloads (e.g., backups for client applications with many new user accounts, which may involve a relatively large number of full snapshots), the DMS may use a semaphore parameter with a higher value, thereby enabling the DMS to backup more data objects at substantially the same time. Likewise, for smaller backup workloads (e.g., backups for client applications with relatively few new user accounts, which may involve mostly incremental snapshots), the DMS may use a semaphore parameter with a lower value. Reducing the value of a semaphore parameter for a smaller backup workload may enable the DMS to more efficiently allocate computational resources to other workloads and client systems. In some examples, the DMS may configure a buffer percentage for each semaphore parameter to mitigate any potential failures that occur during the backup process.

Aspects of the present disclosure may be implemented to realize one or more of the following advantages. The dynamic resource scaling techniques described herein may enable a DMS to execute backup workloads with greater processing efficiency, reduced latency, and decreased computational resource overhead, among other benefits. For example, the described techniques may enable a DMS to dynamically allocate more processing resources to larger backup workloads (or backup workloads with a higher failure rate) and fewer processing resources to smaller backup workloads by adjusting respective semaphore parameters for each backup workload on the basis of workload size, backup history, backup type, etc. As a result, the DMS may experience fewer compliance and/or load balancing issues while executing larger backup workloads.

Aspects of the disclosure are initially described in the context of computing environments, flowcharts, and process flows. Aspects of the disclosure are further illustrated by and described with reference to apparatus diagrams, system diagrams, and flowcharts that relate to dynamic resource scaling for large-scale backups.

FIG. 1 illustrates an example of a computing environment 100 that supports dynamic resource scaling for large-scale backups in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125.

The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices.

The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment.

A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure.

For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185.

In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185.

A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable.

Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g. a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time).

Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135.

To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115).

Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely.

In accordance with the techniques described herein, the DMS 110 may determine to generate a backup instance of an application that includes multiple user accounts. The DMS 110 may identify a time window for generation of the backup instance based on a set of backup parameters associated with the application. The DMS 110 may calculate respective runtime durations for the user accounts based on respective quantities of data objects in the user accounts and respective backup job types associated with the data objects. The DMS 110 may determine respective values of a semaphore parameter based on the respective runtime durations and the time window, where the semaphore parameter corresponds to a threshold quantity of data objects to be processed in parallel during generation of the backup instance. Accordingly, the DMS may generate the backup instance of the application based on processing the user accounts in accordance with the respective values of the semaphore parameter.

Aspects of the computing environment 100 may be implemented to realize one or more of the following advantages. The dynamic resource scaling techniques described with reference to FIG. 1 may enable the DMS 110 to execute backup workloads with greater processing efficiency, reduced latency, and decreased computational resource overhead, among other benefits. For example, the described techniques may enable the DMS 110 (or components thereof) to dynamically allocate more processing resources to larger backup workloads (or backup workloads with a higher failure rate) and fewer processing resources to smaller backup workloads by adjusting respective semaphore parameters for each backup workload on the basis of workload size, backup history, backup type, etc. As a result, the DMS 110 may experience fewer compliance and/or resource load issues while executing larger backup workloads.

Figure 2:
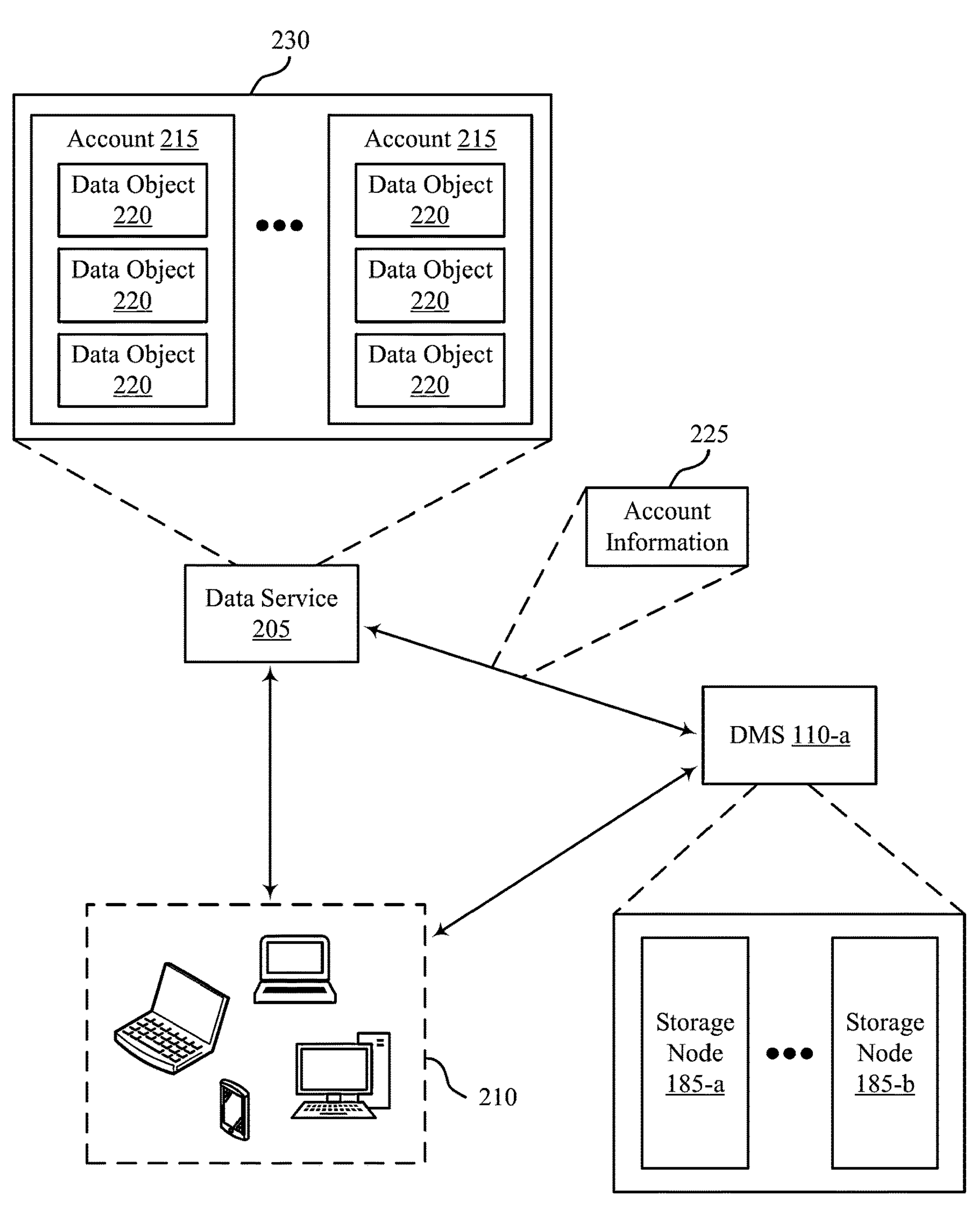

FIG. 2 illustrates an example of a computing environment 200 that supports dynamic resource scaling for large-scale backups in accordance with one or more aspects of the present disclosure. The computing environment 200 may implement or be implemented by one or more aspects of the computing environment 100. For example, the computing environment 200 includes a DMS 110-*a*, a storage node 185-*a*, and a storage node 185-*b*, which may be examples of corresponding devices, systems, and services described with reference to FIG. 1. The computing environment 200 also includes a data service 205 and a client system 210, which may communicate using a variety of interfaces and communication protocols. In the computing environment 200, the DMS 110-*a* may backup various data objects 220 in user accounts 215 of an application 230 supported by a data service 205.

In the example of FIG. 2, devices associated with a client system 210 (e.g., a customer of the DMS 110-*a*) may access an application 230 provided by a data service 205. The devices of the client system 210 may communicate with the data service 205 using an application programming interface (API) supported by the data service 205. The application 230 may include various user accounts 215, each of which may correspond to a user of the client system 210. Each of the user accounts 215 may include one or more data objects 220. The data objects 220 may include emails, files, documents, pictures, metadata, or account settings, among other examples.

The DMS 110-*a* may store snapshots (e.g., the snapshots 135 described with reference to FIG. 1) of the application 230 across one or both of the storage node 185-*a* or the storage node 185-*b*. The DMS 110-*a* may generate the snapshots using account information 225 provided by the data service 205. The account information 225 may include data that pertains to the user accounts 215 associated with the client system 210. For example, the account information 225 may include an indication of the data objects 220 in each of the user accounts 215. Additionally, or alternatively, the account information 225 may include an indication of which data objects 220 were modified, added, or deleted in a given time interval. In some examples, the data service 205 may retrieve the account information 225 using a key provided by the DMS 110-*a*.

The DMS 110-*a* may have compliance regulations for maintaining and updating backups (also referred to as snapshots) of the application 230 for the client system 210. In some cases, when the client system 210 begins protecting backups of the application 230 (e.g., a cloud-based web application supported by the data service 205) at scale, the first full backups of the application 230 may take several weeks or months to complete. After the first full backups of the application 230 are finished, the DMS 110-*a* may enter a steady state in which the DMS 110-*a* performs mostly incremental backup jobs. If, however, new data objects 220 are protected by the client system 210, the DMS 110-*a* may go out of compliance again. In some examples, the DMS 110-*a* may use algorithms to help generate backup instances (also referred to as snappables) of the application 230. However, some algorithms that rely on average approximations may be unsuitable for deployments in which the number of items (data objects 220), total size, or associated resource regulations vary across snappables.

Aspects of the present disclosure support techniques for monitoring overall system load and dynamically scaling resources to comply with regulations of the DMS 110-*a*. For backup workloads to execute efficiently at scale, the DMS 110-*a* may dynamically compute a backup semaphore permit (which defines the number of backup jobs to run in parallel) for each of the user accounts 215. In some cases, a value of the backup semaphore permit may increase rapidly during an initial onboarding period for the client system 210, as well as when the client system 210 begins protecting new user accounts 215. Once the DMS 110-*a* reaches steady state (e.g., after the initial onboarding period), the DMS 110-*a* may reduce the backup semaphore permit to ensure that sub-systems of the DMS 110-*a* are not overloaded, and to reduce the associated compute costs.

The dynamic resource scaling mechanisms described herein may be applicable to both uniform and non-uniform backup workloads, and may enable the DMS 110-*a* to adapt to fluctuating workload demands of the client system 210. In accordance examples disclosed herein, the DMS 110-*a* may dynamically track (monitor and save) a history of backup jobs for the client system 210, thereby enabling the DMS 110-*a* to adjust backup parameters for each client based on previously executed backup workloads. The DMS 110-*a* may also dynamically track backup job runtime information for previous incremental backups and full backups at a client level to effectively calculate semaphore permits for each client.

The DMS 110-*a* may execute backup jobs by interacting with the data service 205 (e.g., a third-party system). In some examples, if an incremental backup job is unsuccessful (for example, due to a corruption of a synchronization state between the DMS 110-*a* and the data service 205 or an API failure associated with the data service 205), the DMS 110-*a* may execute a failsafe full backup job, which may use additional computational resources. If failsafe full backup jobs are executed incorrectly, the DMS 110-*a* may experience compliance issues. In accordance with aspects of the present disclosure, the DMS 110-*a* may store and use failure-related information (such as a time at which a failsafe full backup job was initiated or a data object associated with a failsafe full backup job) to more accurately calculate semaphore permit values for subsequent backup jobs.

In some examples, the DMS 110-*a* may experience failures or other unexpected scenarios when generating backups of the application 230 for the client system 210 in a distributed compute environment (such as the computing environment 200). For example, one or both of the data service 205 or the DMS 110-*a* may become disconnected from a network (such as the network 120 described with reference to FIG. 1), or may experience periods of high network latency. Additionally, or alternatively, some dependent systems within the DMS 110-*a* may experience operational failures or delays for a period of time. The techniques described herein may enable the DMS 110-*a* to mitigate such failures by configuring a buffer percentage for each semaphore permit. This buffer percentage may be dynamic across all user accounts 215, and may be used to increase the value of a semaphore permit in the event of an unexpected failure.

To determine a suitable resource allocation scheme (e.g., a semaphore permit) for backup workloads associated with the client system 210, the DMS 110-*a* may iterate through all user accounts 215 and all data objects 220 within the user accounts. Thus, calculating semaphore permits for client backup workloads may be associated with relatively higher compute costs. The techniques described herein may enable the DMS 110-*a* to make such determinations as needed (for example, when compliance issues are detected) to avoid incurring high compute costs, and to improve the scalability of such mechanisms.

For example, the DMS 110-*a* (or components thereof) may dynamically calculate semaphore permits every hour if a backup instance (snappable) of the application 230 is out of compliance. The DMS 110-*a* may determine whether the backup instance of the application 230 is out of compliance by executing a report job to determine how many snapshots of the application 230 have been missed (e.g., not performed or performed unsuccessfully). If the backup instance is in compliance, the DMS 110-*a* may calculate semaphore permits once a day to reduce the overall computational load associated with such calculations.

Figure 3:
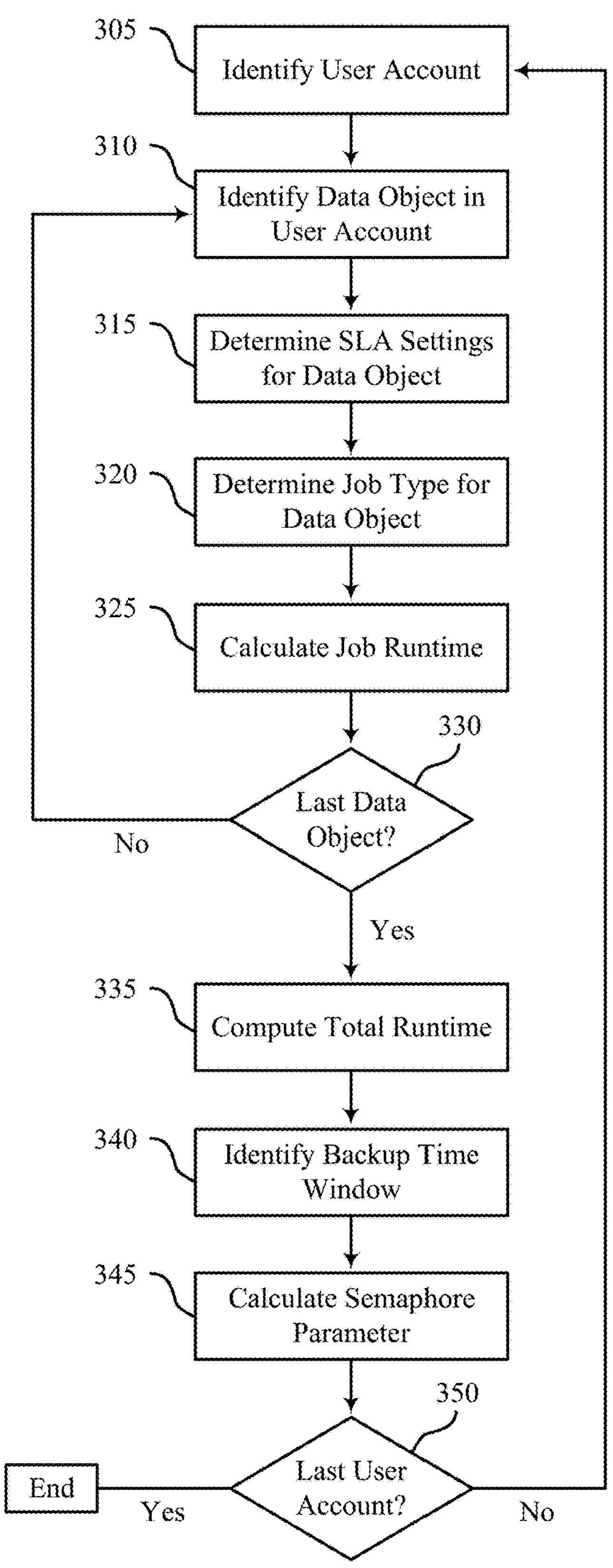
FIG. 3 illustrates an example of a flowchart that supports dynamic resource scaling for large-scale backups in accordance with one or more aspects of the present disclosure.

FIG. 3 illustrates an example of a flowchart 300 that supports dynamic resource scaling for large-scale backups in accordance with one or more aspects of the present disclosure. The flowchart 300 may implement or be implemented by one or more aspects of the computing environment 100 or the computing environment 200. For example, aspects of the flowchart 300 may be implemented by a DMS, such as the DMS 110-*a* described with reference to FIG. 2. In the example of FIG. 3, a DMS may calculate respective semaphore permit values for user accounts to be included in a backup instance of an application associated with a customer of the DMS. The DMS may calculate a semaphore permit value for each user account by iteratively assessing the backup status of each data object in the user account.

At 305, the DMS may identify a user account (such as the user accounts 215 described with reference to FIG. 2) within an application supported by a data service. The user account may correspond to a customer of the DMS. At 310, the DMS may identify a data object (such as the data objects 220 described with reference to FIG. 2) within the user account. As described herein, the data object may be an example of an email, a file, a document, an image, or the like. At 315, the DMS may determine SLA settings for the data object. For example, the DMS may determine a frequency at which full and incremental snapshots of the data object are to be taken.

At 320, the DMS may determine a job type (full or incremental) for the data object based on the associated SLA settings and a backup status of the data object (e.g., whether the DMS has a full snapshot of the data object stored in memory). For example, if the data object is a newly protected data object (e.g., if the data object was not present in previous snapshots), the DMS may allocate a full backup job for the data object. In contrast, if the data object was present in earlier snapshots, the DMS may allocate an incremental backup job to capture any changes to the data object (with respect to the earlier snapshots).

At 325, the DMS may calculate a backup job runtime for the data object based on the job type and historical data associated with previously executed backup jobs. For example, the DMS may calculate or determine an expected runtime for a full backup job based on historical runtime data for previous full backup jobs associated with the customer. Likewise, the DMS may calculate or determine an expected runtime for an incremental backup job based on historical runtime data for previous incremental backup jobs associated with the application. The DMS may track full backup job runtime at a customer level. The DMS may save full backup information in a database (such as a table) at the end of each full backup job.

If the DMS has access to average full backup job runtime for the customer, the DMS can use this information to determine an estimated runtime for full backups of newly protected objects. As such, the DMS can efficiently allocate semaphore permits so the full backups (snapshots) can be completed in a shorter timeframe. The DMS may track incremental job runtime at a snappable level, and may store this data in association with the resulting snappable (e.g., a backup instance of the application). Different data objects may have different churn rates and/or backup completion times. Hence, it may be desirable for the DMS to track incremental job runtime at the snappable level.

At 330, the DMS may determine whether all data objects in the user account have been processed. If the current data object corresponds to a last data object in the user account (e.g., if the DMS has processed all data objects in the user account), the DMS may proceed to 335. Otherwise (e.g., if there are other data objects to be processed), the DMS may iteratively perform the operations of 310 through 325 for each remaining data object in the user account.

At 335, the DMS may compute a total runtime for the user account by summing up the estimated job runtimes for each data object in the user account. At 340, the DMS may identify a time window in which a backup of the user account is to be generated. In some examples, the DMS may determine the time window according to one or more policies defined in an SLA between the DMS and the customer.

At 345, the DMS may calculate a semaphore permit value for the user account such that all data objects in the user account can be processed within the identified time window. For example, if an SLA between the DMS and the customer indicates that incremental snapshots of the user account are to be taken every 4 hours and full snapshots of the user account are to be taken every 24 hours, the DMS may determine that 7 total snapshots of the user account (6 incremental and 1 full) are to be taken within a time window of 24 hours. Accordingly, the DMS may determine a semaphore permit value so that all 7 snapshots of the user account can be completed within the 24 hour timespan.

At 350, the DMS may determine whether all user accounts in the application have been processed. If the current user account corresponds to a last user account associated with the customer (e.g., if the DMS has processed all other user accounts), the DMS may begin executing backup workloads in accordance with the semaphore permit values calculated at 345. Otherwise, the DMS may iteratively perform the operations of 305 through 345 to calculate a semaphore permit value for each remaining user account.

The DMS may perform the operations of 305 through 350 on an account level. In other words, the DMS may iterate over all user accounts in the application and calculate semaphore permits accordingly. Assigning higher semaphore permit values may result in the DMS running more jobs in parallel, which may increase the overall load on the DMS and cause scaling issues for backup workloads. In contrast, assigning lower semaphore permit values may lead to compliance issues for customers of the DMS. Thus, calculating appropriate semaphore permit values may ensure that the DMS is able to scale backup workloads efficiently and maintain compliance.

Figure 4:
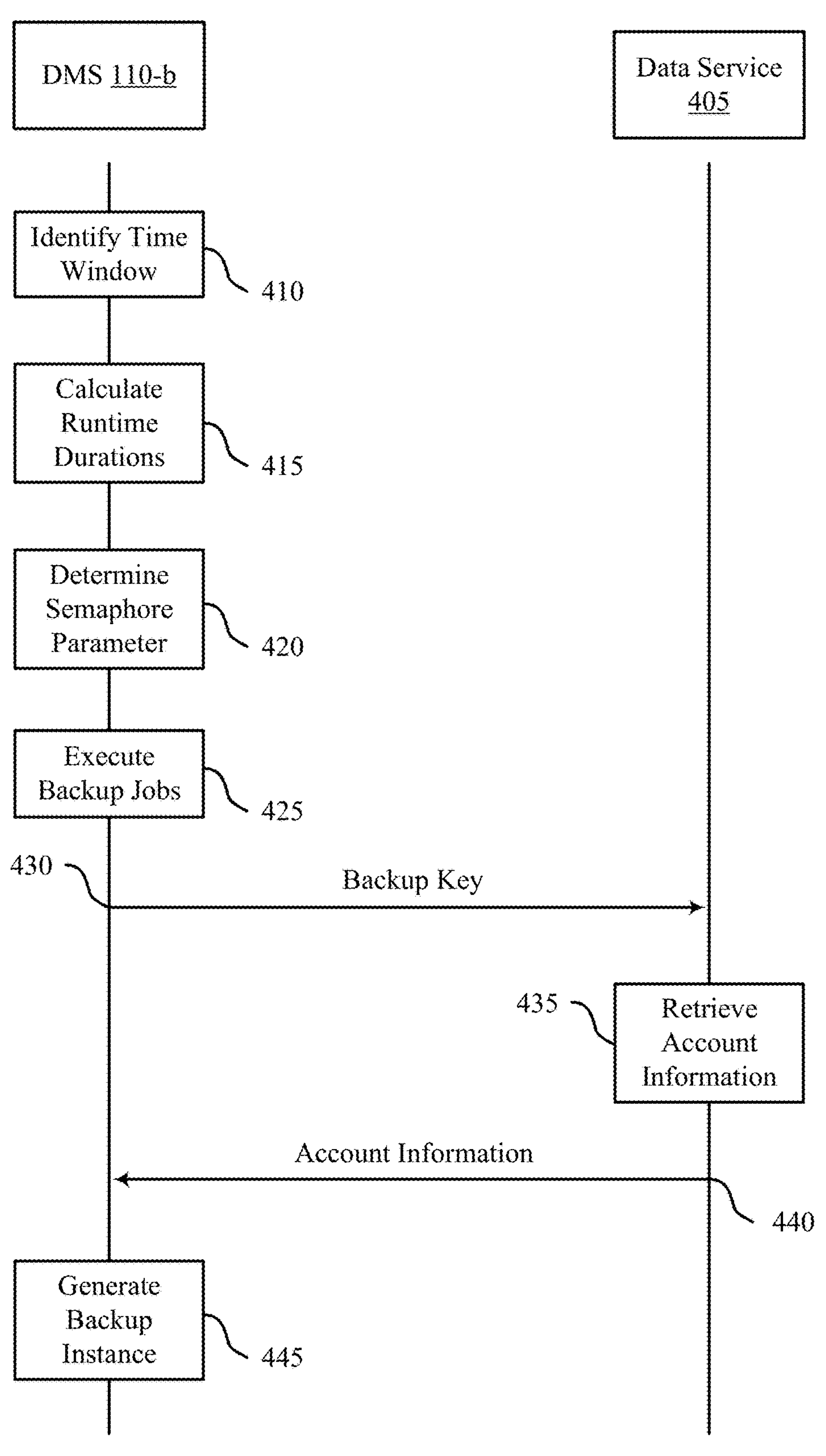
FIG. 4 illustrates an example of a process flow that supports dynamic resource scaling for large-scale backups in accordance with one or more aspects of the present disclosure.

FIG. 4 illustrates an example of a process flow 400 that supports dynamic resource scaling for large-scale backups in accordance with one or more aspects of the present disclosure. The process flow 400 may implement or be implemented by one or more aspects of the computing environment 100, the computing environment 200, or the flowchart 300. For example, the process flow 400 includes a DMS 110-*b* and a data service 405, which may be examples of corresponding systems and services described with reference to FIGS. 1 through 3. In the following description of the process flow 400, operations between the DMS 110-*b* and the data service 405 may be added, omitted, or performed in a different order (with respect to the exemplary order shown).

As described herein, the DMS 110-*b* may determine to generate a backup instance of an application that includes multiple user accounts. In some examples, the DMS 110-*b* may determine to generate the backup instance based on an indication from a client device (such as the computing device 115 described with reference to FIG. 1), an indication from an administrator of the DMS 110-*b*, an indication from a sub-system of the DMS 110-*b* (e.g., a job scheduling service supported by the DMS 110-*b*), or the like.

At 410, the DMS 110-*b* may identify a time window for generation of the backup instance of the application based on a set of parameters associated with the application. In some examples, the set of parameters may be defined by an SLA between the DMS 110-*b* and a client of the DMS 110-*b*. The set of parameters may indicate a frequency at which the DMS 110-*b* is to generate full backups of the application (e.g., every 24 hours), a frequency at which the DMS 110-*b* is to generate incremental backups of the application (e.g., every 4 hours), and other pertinent information (e.g., archival policies, deletion policies, duplication settings).

At 415, the DMS 110-*b* may calculate respective runtime durations for backup workloads associated with the user accounts. The DMS 110-*b* may calculate the respective runtime durations based on respective quantities of data objects (emails, files, metadata) in the user accounts and respective backup job types (full or incremental) associated with the data objects in the user accounts. In some examples, the DMS 110-*b* may determine a backup job type for a data object based on a backup status of the data object (whether the DMS 110-*b* has a full snapshot of the data object stored in memory) and a compliance status of the data object (whether additional snapshots of the data object are needed to comply with SLA policies).

In some examples, the DMS 110-*b* may determine the respective runtime durations for the backup workloads based on historical backup data associated with the application or the client. For example, the DMS 110-*b* may use an average time duration of previous full backup jobs associated with the client to estimate a total job runtime for new (unprotected) data objects in the user accounts. Additionally, or alternatively, the DMS 110-*b* may use an average time duration of incremental backup jobs associated with the application to estimate a total job runtime for existing (protected) data objects in the user accounts.

At 420, the DMS 110-*b* may determine respective semaphore parameter values for the user accounts based on the respective runtime durations for the user accounts and the time window in which the backup instance of the application is to be generated. As described herein, a semaphore parameter (also referred to as a semaphore permit) may define the number of backup jobs to run in parallel, where a backup job refers to the process of backing up a data object within a user account. The DMS 110-*b* may determine values for the semaphore parameter on a per-account basis, such that all data objects in a user account can be processed within the specified time window.

At 425, the DMS 110-*b* may begin generating the backup instance of the application by executing respective backup workloads for the user accounts. To generate backups (snapshots) of data objects in a user account, the DMS 110-*b* may provide a data service 405 (e.g., a cloud-based web service that supports the application) with a key at 430. The DMS 110-*b* may provide the data service 405 with the key via an API supported by the data service 405. The key may indicate or correspond to a time at which the DMS 110-*b* last generated a snapshot of the user account (e.g., the last time the user account was backed up). In some examples, the key may also identify the client, the application, the user account, a specific data object in the user account, etc. At 435, the data service 405 may use the key provided by the DMS 110-*b* to identify which data objects (if any) have been modified, added, or removed from the user account since the last snapshot was taken.

At 440, the data service 405 may return (via the API) data associated with the requested user account. For example, the data service 405 may return a list of emails added to the user account since the last snapshot, a list of files deleted from the user account since the last snapshot, etc. If, for example, the user account is new (unprotected), the data service 405 may return all pertinent metadata and information for the user account such that the DMS 110-*b* can generate a full snapshot of the new user account. In some examples, if an incremental backup job is unsuccessful (due to a network failure, an API failure, or a key-related failure), the DMS 110-*b* may execute a failsafe full backup job to obtain a full snapshot of the associated data object.

At 445, the DMS 110-*b* may generate the backup instance of the application based on processing the user accounts in accordance with the respective values of the semaphore parameter determined at 420. For example, the DMS 110-*b* may process multiple data objects of a user account in parallel (at substantially the same time) such that all data objects in the user account are backed up within the time window identified at 410. After obtaining or generating a full backup of a user account, the DMS 110-*b* may, in some examples, reduce a value of the semaphore parameter for the user account. In some examples, the DMS 110-*b* may generate the backup instance of the application by aggregating or processing the account information provided by the data service 405.

Figure 5:
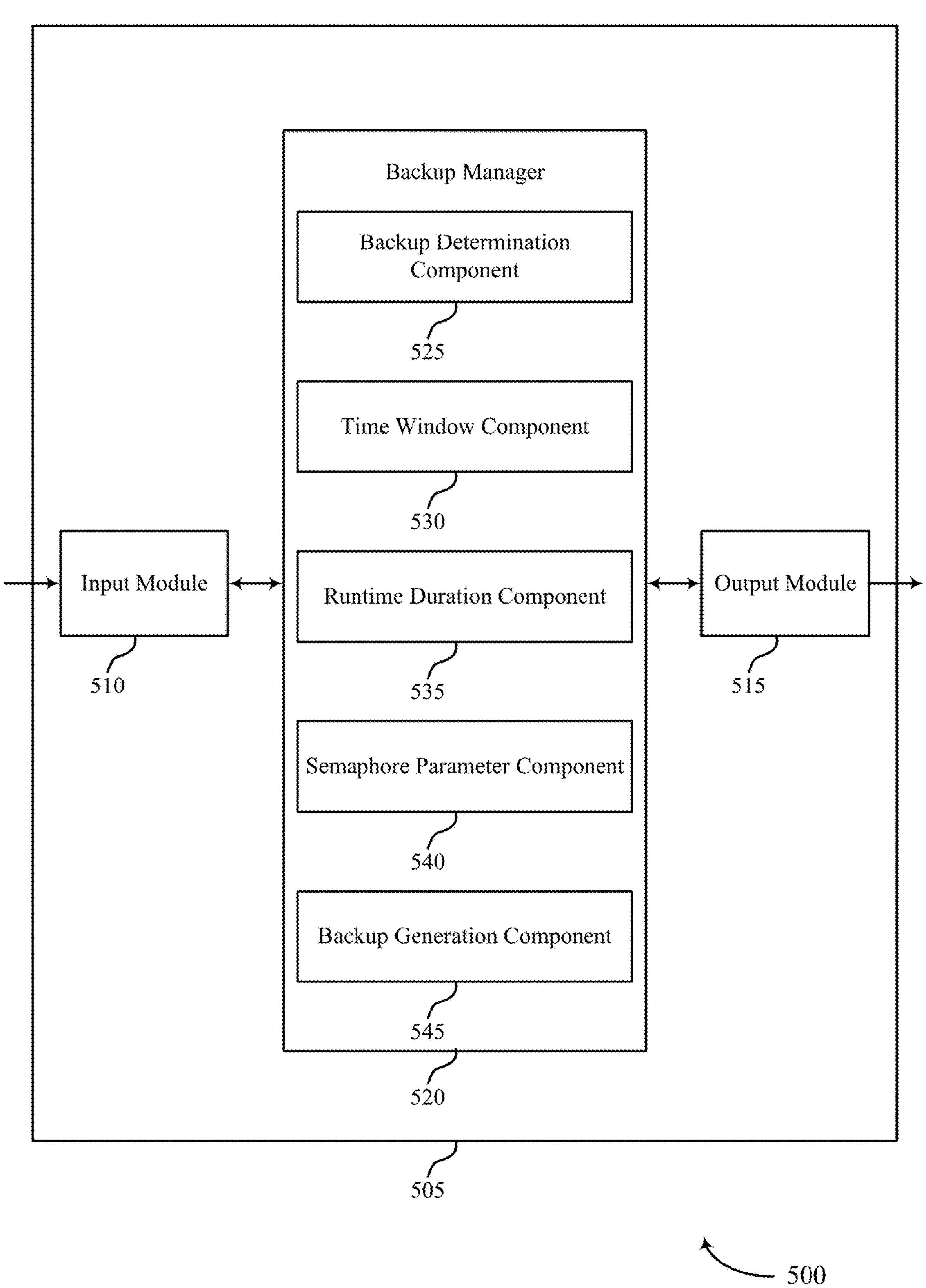
FIG. 5 shows a block diagram of an apparatus that supports dynamic resource scaling for large-scale backups in accordance with one or more aspects of the present disclosure.

FIG. 5 shows a block diagram 500 of a system 505 that supports dynamic resource scaling for large-scale backups in accordance with aspects of the present disclosure. In some examples, the system 505 may be an example of aspects of one or more components described with reference to FIG. 1, such as a DMS 110. The system 505 may include an input interface 510, an output interface 515, and a backup manager 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the backup manager 520 to support dynamic resource scaling for large-scale backups. In some cases, the input interface 510 may be a component of a network interface 715 as described with reference to FIG. 7.

The output interface 515 may manage output signaling for the system 505. For example, the output interface 515 may receive signaling from other components of the system 505, such as the backup manager 520, and may transmit such output signaling corresponding to (e.g., representative of or otherwise based on) such signaling to other systems or devices. In some cases, the output interface 515 may be a component of a network interface 715 as described with reference to FIG. 7.

The backup manager 520 may include a backup determination component 525, a time window component 530, a runtime duration component 535, a semaphore parameter component 540, a backup generation component 545, or any combination thereof. In some examples, the backup manager 520, or various components thereof, may be configured to perform various operations (e.g., receiving, monitoring, transmitting) using or otherwise in cooperation with the input interface 510, the output interface 515, or both. For example, the backup manager 520 may receive information from the input interface 510, send information to the output interface 515, or be integrated in combination with the input interface 510, the output interface 515, or both to receive information, transmit information, or perform various other operations as described herein.

The backup manager 520 may support data management in accordance with examples as disclosed herein. The backup determination component 525 may be configured as or otherwise support a means for determining, by a DMS (such as the system 505), to generate a backup instance of an application that includes multiple user accounts. The time window component 530 may be configured as or otherwise support a means for identifying, by the DMS, a time window for generation of the backup instance based on a set of backup parameters associated with the application. The runtime duration component 535 may be configured as or otherwise support a means for calculating, by the DMS, for generation of the backup instance, respective runtime durations for the multiple user accounts based on respective quantities of data objects in the multiple user accounts and respective backup job types associated with the data objects. The semaphore parameter component 540 may be configured as or otherwise support a means for determining, by the DMS, for the multiple user accounts, respective values of a semaphore parameter based on the respective runtime durations and the time window, where the semaphore parameter corresponds to a threshold quantity of data objects to be processed in parallel as part of the generation of the backup instance. The backup generation component 545 may be configured as or otherwise support a means for generating, by the DMS, the backup instance of the application based on processing the multiple user accounts in accordance with the respective values of the semaphore parameter.

Figure 6:
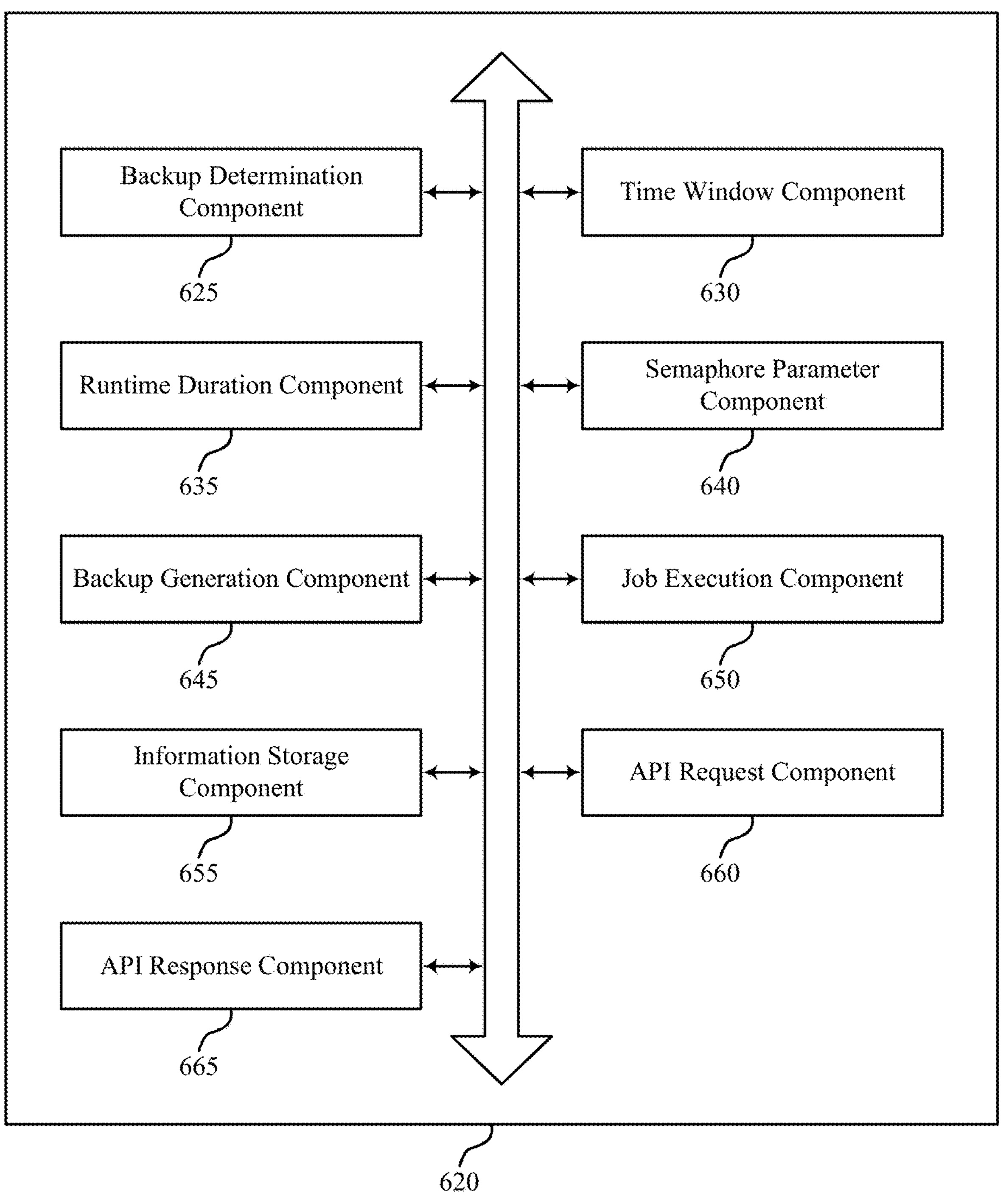
FIG. 6 shows a block diagram of a backup manager that supports dynamic resource scaling for large-scale backups in accordance with one or more aspects of the present disclosure.

FIG. 6 shows a block diagram 600 of a backup manager 620 that supports dynamic resource scaling for large-scale backups in accordance with one or more aspects of the present disclosure. The backup manager 620 may be an example of aspects of a backup manager or a backup manager 520, or both, as described herein. The backup manager 620, or various components thereof, may be an example of means for performing various aspects of dynamic resource scaling for large-scale backups, as described herein. For example, the backup manager 620 may include a backup determination component 625, a time window component 630, a runtime duration component 635, a semaphore parameter component 640, a backup generation component 645, a job execution component 650, an information storage component 655, an API request component 660, an API response component 665, or any combination thereof. Each of these components may communicate, directly or indirectly, with one another (e.g., via one or more buses).

The backup manager 620 may support data management in accordance with examples as disclosed herein. The backup determination component 625 may be configured as or otherwise support a means for determining, by a DMS, to generate a backup instance of an application that includes multiple user accounts. The time window component 630 may be configured as or otherwise support a means for identifying, by the DMS, a time window for generation of the backup instance based on a set of backup parameters associated with the application. The runtime duration component 635 may be configured as or otherwise support a means for calculating, by the DMS, for generation of the backup instance, respective runtime durations for the multiple user accounts based on respective quantities of data objects in the multiple user accounts and respective backup job types associated with the data objects. The semaphore parameter component 640 may be configured as or otherwise support a means for determining, by the DMS, for the multiple user accounts, respective values of a semaphore parameter based on the respective runtime durations and the time window, where the semaphore parameter corresponds to a threshold quantity of data objects to be processed in parallel as part of the generation of the backup instance. The backup generation component 645 may be configured as or otherwise support a means for generating, by the DMS, the backup instance of the application based on processing the multiple user accounts in accordance with the respective values of the semaphore parameter.

In some examples, to support generating the backup instance of the application, the job execution component 650 may be configured as or otherwise support a means for executing, by the DMS, one or more full backup jobs to generate full backups for a first set of data objects in a user account of the multiple user accounts. In some examples, to support generating the backup instance of the application, the job execution component 650 may be configured as or otherwise support a means for executing, by the DMS, one or more incremental backup jobs to generate incremental backups for a second set of data objects in the user account.

In some examples, the plurality of user accounts are associated with a client of the DMS. And in some examples, to support calculating the respective runtime durations for the multiple user accounts, the runtime duration component 635 may be configured as or otherwise support a means for calculating, by the DMS, a runtime duration for the one or more full backup jobs based on an average runtime duration of previous full backup jobs associated with the client of the DMS.

In some examples, to support calculating the respective runtime durations for the multiple user accounts, the runtime duration component 635 may be configured as or otherwise support a means for calculating, by the DMS, a runtime duration for the one or more incremental backup jobs based on an average runtime duration of previous incremental backup jobs associated with the application.

In some examples, to support calculating the respective runtime durations for the multiple user accounts, the runtime duration component 635 may be configured as or otherwise support a means for calculating, by the DMS, a first runtime duration for the one or more full backup jobs and a second runtime duration for the one or more full backup jobs, where a runtime duration for the user account is based on a combination of (e.g., equal to or otherwise based on a sum of) the first runtime duration and the second runtime duration.

In some examples, to support determining the respective values for the semaphore parameter, the semaphore parameter component 640 may be configured as or otherwise support a means for determining, by the DMS, a value of the semaphore parameter for a user account that supports all data objects in the user account being processed within the time window.

In some examples, the semaphore parameter component 640 may be configured as or otherwise support a means for updating, by the DMS, the respective values of the semaphore parameter according to a computational load of the DMS, a processing capacity of the DMS, a completion status of the backup instance, or any combination thereof.

In some examples, to support generating the backup instance of the application, the job execution component 650 may be configured as or otherwise support a means for executing, by the DMS, one or more backup jobs to generate backups of the data objects in the multiple user accounts. In some examples, to support generating the backup instance of the application, the information storage component 655 may be configured as or otherwise support a means for storing, by the DMS, runtime information associated with the one or more backup jobs in association with the backup instance of the application.

In some examples, to support generating the backup instance of the application, the job execution component 650 may be configured as or otherwise support a means for executing, by the DMS, an incremental backup job to generate an incremental backup of a data object in a user account of the multiple user accounts. In some examples, to support generating the backup instance of the application, the job execution component 650 may be configured as or otherwise support a means for executing, by the DMS, a full backup job to generate a full backup of the data object in response to detecting a failure associated with the incremental backup job.

In some examples, the information storage component 655 may be configured as or otherwise support a means for storing, by the DMS, information associated with the failure, where the respective values of the semaphore parameter are calculated based on the stored information associated with the failure. In some examples, the failure may be an API failure, a network failure, a dependent service failure, or any combination thereof.

In some examples, to support generating the backup instance of the application, the backup generation component 645 may be configured as or otherwise support a means for executing, by the DMS, an incremental backup job to generate an incremental backup of a data object in a user account of the multiple user accounts. In some examples, to execute the incremental backup job, the API request component 660 may be configured as or otherwise support a means for transmitting, to a data service that supports the application, an API request indicating a key associated with a prior full backup of the data object. In some examples, to execute the incremental backup job, the API response component 665 may be configured as or otherwise support a means for receiving, from the data service, an API response indicating one or more changes made to the data object between a first time associated with generation of the prior full backup and a second time associated with transmission of the API request, where the incremental backup of the data object includes the one or more changes indicated by the API response.

In some examples, to support determining the respective values of the semaphore parameter, the semaphore parameter component 640 may be configured as or otherwise support a means for determining, by the DMS, a buffer percentage for the semaphore parameter based on a failure tolerance of the DMS.

In some examples, the semaphore parameter component 640 may be configured as or otherwise support a means for increasing, by the DMS, a value of the semaphore parameter for a user account in response to detecting a backup job failure associated with the user account, where the value of the semaphore parameter for the user account is increased by a percentage that is less than or equal to the buffer percentage.

In some examples, the respective values of the semaphore parameter are determined in accordance with a schedule that is based on a compliance status of the application.

In some examples, to support determining the respective values of the semaphore parameter, the semaphore parameter component 640 may be configured as or otherwise support a means for reducing, by the DMS, a value of the semaphore parameter for a user account of the multiple user accounts after generating full backups of all data objects in the user account.

In some examples, the data objects may be emails, files, documents, account settings, contacts, or any combination thereof.

In some examples, the set of backup parameters indicate the time window, a full backup policy for the application, an incremental backup policy for the application, a retention policy for the backup instance, an archival policy for the backup instance, a replication policy for the backup instance, or any combination thereof.

Figure 7:
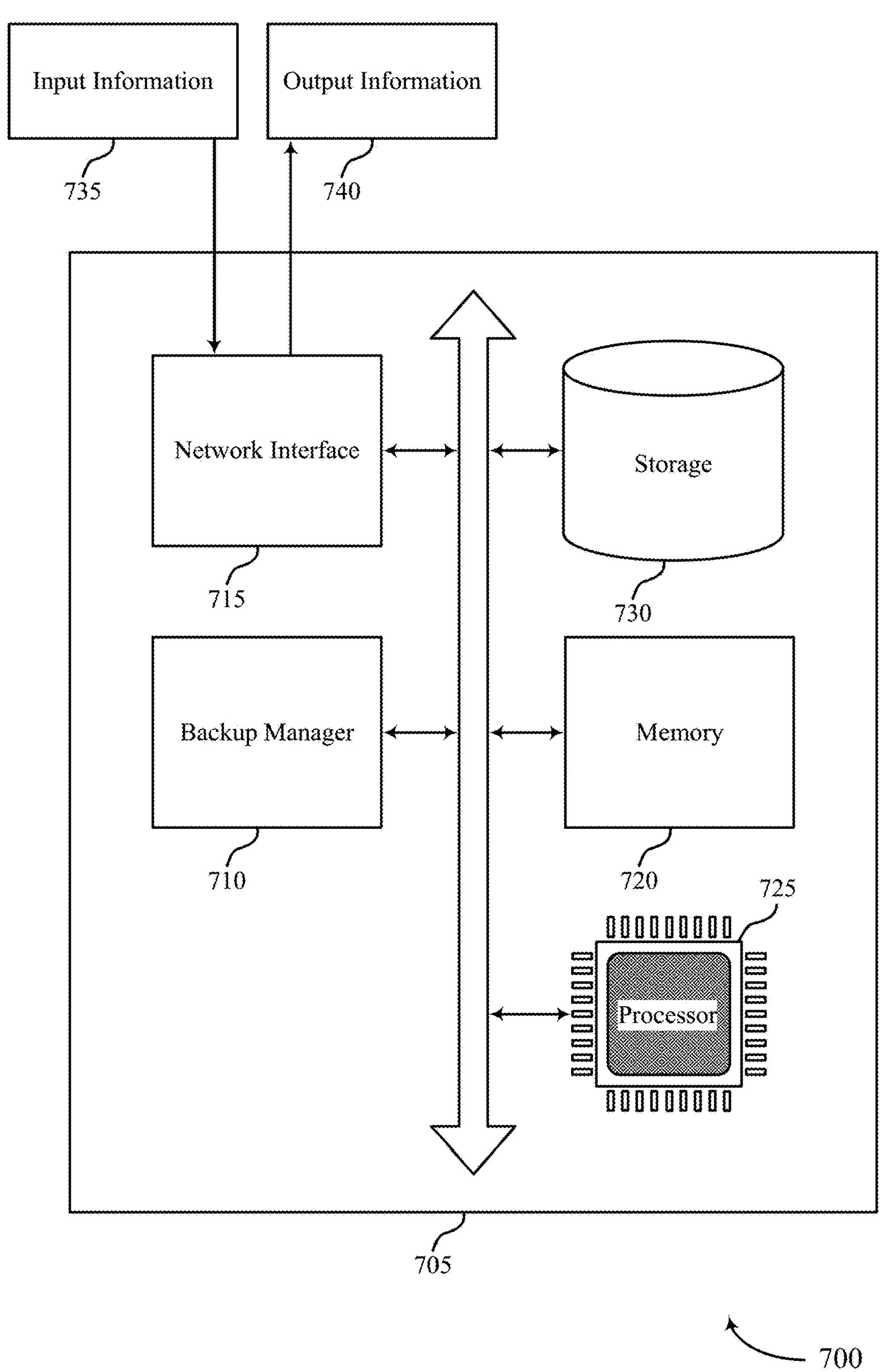
FIG. 7 shows a diagram of a system including a device that supports dynamic resource scaling for large-scale backups in accordance with one or more aspects of the present disclosure.

FIG. 7 shows a block diagram 700 of a system 705 that supports dynamic resource scaling for large-scale backups in accordance with aspects of the present disclosure. The system 705 may be an example of or include aspects of a system 505 as described herein. The system 705 may include components for data management, including components such as a backup manager 710, a network interface 715, memory 720, processor 725, and storage 730. These components may be in electronic communication or otherwise coupled with each other (e.g., operatively, communicatively, functionally, electronically, electrically; via one or more buses, communications links, communications interfaces, or any combination thereof). Additionally, the components of the system 705 may comprise corresponding physical components or may be implemented as corresponding virtual components (e.g., components of one or more virtual machines). In some examples, the system 705 may be an example of aspects of one or more components described with reference to FIG. 1, such as a DMS 110.

The network interface 715 may enable the system 705 to exchange information (e.g., input information 735, output information 740, or both) with other systems or devices (not shown). For example, the network interface 715 may enable the system 705 to connect to a network (e.g., a network 120 as described herein). The network interface 715 may include one or more wireless network interfaces, one or more wired network interfaces, or any combination thereof. In some examples, the network interface 715 may be an example of may be an example of aspects of one or more components described with reference to FIG. 1, such as one or more network interfaces 165.

Memory 720 may include RAM, ROM, or both. The memory 720 may store computer-readable, computer-executable software including instructions that, when executed, cause the processor 725 to perform various functions described herein. In some cases, the memory 720 may contain, among other things, a basic input/output system (BIOS), which may control basic hardware or software operation such as the interaction with peripheral components or devices. In some cases, the memory 720 may be an example of aspects of one or more components described with reference to FIG. 1, such as one or more memories 175.

The processor 725 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 725 may be configured to execute computer-readable instructions stored in a memory 720 to perform various functions (e.g., functions or tasks supporting dynamic resource scaling for large-scale backups). Though a single processor 725 is depicted in the example of FIG. 7, it is to be understood that the system 705 may include any quantity of one or more of processors 725 and that a group of processors 725 may collectively perform one or more functions ascribed herein to a processor, such as the processor 725. In some cases, the processor 725 may be an example of aspects of one or more components described with reference to FIG. 1, such as one or more processors 170.

Storage 730 may be configured to store data that is generated, processed, stored, or otherwise used by the system 705. In some cases, the storage 730 may include one or more HDDs, one or more SDDs, or both. In some examples, the storage 730 may be an example of a single database, a distributed database, multiple distributed databases, a data store, a data lake, or an emergency backup database. In some examples, the storage 730 may be an example of one or more components described with reference to FIG. 1, such as one or more network disks 180.

The backup manager 710 may support data management in accordance with examples as disclosed herein. The backup manager 710 may be configured as or otherwise support a means for determining, by a DMS (such as the system 705), to generate a backup instance of an application that includes multiple user accounts. The backup manager 710 may be configured as or otherwise support a means for identifying, by the DMS, a time window for generation of the backup instance based on a set of backup parameters associated with the application. The backup manager 710 may be configured as or otherwise support a means for calculating, by the DMS, for generation of the backup instance, respective runtime durations for the multiple user accounts based on respective quantities of data objects in the multiple user accounts and respective backup job types associated with the data objects. The backup manager 710 may be configured as or otherwise support a means for determining, by the DMS, for the multiple user accounts, respective values of a semaphore parameter based on the respective runtime durations and the time window, where the semaphore parameter corresponds to a threshold quantity of data objects to be processed in parallel as part of the generation of the backup instance. The backup manager 710 may be configured as or otherwise support a means for generating, by the DMS, the backup instance of the application based on processing the multiple user accounts in accordance with the respective values of the semaphore parameter.

By including or configuring the backup manager 710 in accordance with examples as described herein, the system 705 may support techniques for dynamic resource scaling for large-scale backups, which may provide one or more benefits such as, for example, more efficient utilization of computing resources and network resources, reduced latency, and improved scalability, among other possibilities.

Figure 8:
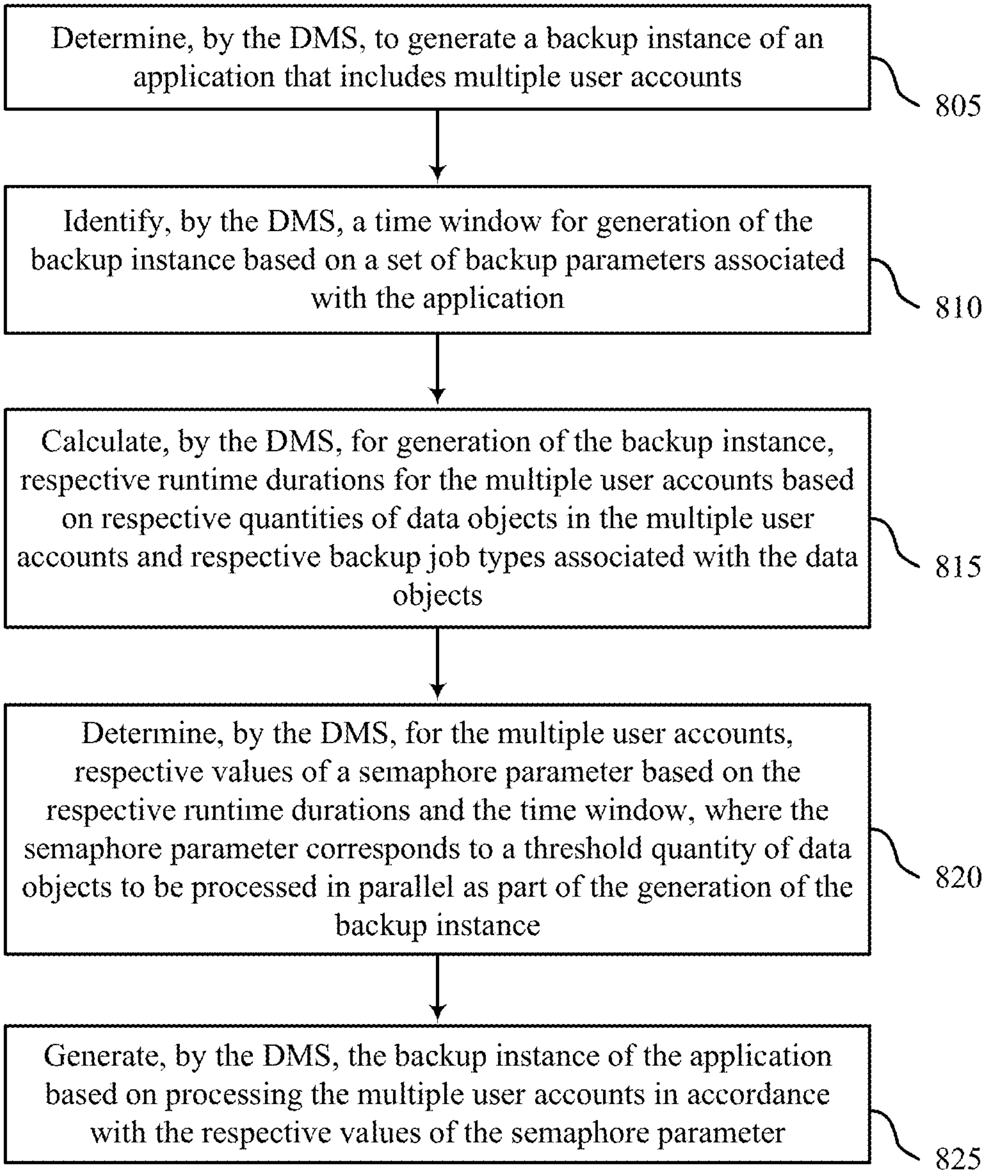

FIG. 8 shows a flowchart illustrating a method 800 that supports dynamic resource scaling for large-scale backups in accordance with one or more aspects of the present disclosure. The operations of the method 800 may be implemented by a DMS, or components thereof. For example, the operations of the method 800 may be performed by a DMS 110, as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include determining, by the DMS, to generate a backup instance of an application that includes multiple user accounts. The operations of 805 may be performed in accordance with examples disclosed herein. In some examples, aspects of the operations of 805 may be performed by a backup determination component 625, as described with reference to FIG. 6.

At 810, the method may include identifying, by the DMS, a time window for generation of the backup instance based on a set of backup parameters associated with the application. The operations of 810 may be performed in accordance with examples disclosed herein. In some examples, aspects of the operations of 810 may be performed by a time window component 630, as described with reference to FIG. 6.

At 815, the method may include calculating, by the DMS, for generation of the backup instance, respective runtime durations for the multiple user accounts based on respective quantities of data objects in the multiple user accounts and respective backup job types associated with the data objects. The operations of 815 may be performed in accordance with examples disclosed herein. In some examples, aspects of the operations of 815 may be performed by a runtime duration component 635, as described with reference to FIG. 6.

At 820, the method may include determining, by the DMS, for the multiple user accounts, respective values of a semaphore parameter based on the respective runtime durations and the time window, where the semaphore parameter corresponds to a threshold quantity of data objects to be processed in parallel as part of the generation of the backup instance. The operations of 820 may be performed in accordance with examples disclosed herein. In some examples, aspects of the operations of 820 may be performed by a semaphore parameter component 640, as described with reference to FIG. 6.

At 825, the method may include generating, by the DMS, the backup instance of the application based on processing the multiple user accounts in accordance with the respective values of the semaphore parameter. The operations of 825 may be performed in accordance with examples disclosed herein. In some examples, aspects of the operations of 825 may be performed by a backup generation component 645, as described with reference to FIG. 6.

FIG. 9 shows a flowchart illustrating a method 900 that supports dynamic resource scaling for large-scale backups in accordance with one or more aspects of the present disclosure. The operations of the method 900 may be implemented by a DMS, or components thereof. For example, the operations of the method 900 may be performed by a DMS 110, as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include determining, by the DMS, to generate a backup instance of an application that includes multiple user accounts. The operations of 905 may be performed in accordance with examples disclosed herein. In some examples, aspects of the operations of 905 may be performed by a backup determination component 625, as described with reference to FIG. 6.

At 910, the method may include identifying, by the DMS, a time window for generation of the backup instance based on a set of backup parameters associated with the application. The operations of 910 may be performed in accordance with examples disclosed herein. In some examples, aspects of the operations of 910 may be performed by a time window component 630, as described with reference to FIG. 6.

At 915, the method may include calculating, by the DMS, for generation of the backup instance, respective runtime durations for the multiple user accounts based on respective quantities of data objects in the multiple user accounts and respective backup job types associated with the data objects. The operations of 915 may be performed in accordance with examples disclosed herein. In some examples, aspects of the operations of 915 may be performed by a runtime duration component 635, as described with reference to FIG. 6.

At 920, the method may include determining, by the DMS, for the multiple user accounts, respective values of a semaphore parameter based on the respective runtime durations and the time window, where the semaphore parameter corresponds to a threshold quantity of data objects to be processed in parallel as part of the generation of the backup instance. The operations of 920 may be performed in accordance with examples disclosed herein. In some examples, aspects of the operations of 920 may be performed by a semaphore parameter component 640, as described with reference to FIG. 6.

At 925, the method may include generating, by the DMS, the backup instance of the application based on processing the multiple user accounts in accordance with the respective values of the semaphore parameter, where generating the backup instance of the application includes executing, by the DMS, one or more full backup jobs to generate full backups for a first set of data objects in a user account of the multiple user accounts and executing, by the DMS, one or more incremental backup jobs to generate incremental backups for a second set of data objects in the user account. The operations of 925 may be performed in accordance with examples disclosed herein. In some examples, aspects of the operations of 925 may be performed by a backup generation component 645, as described with reference to FIG. 6.

Figure 10:
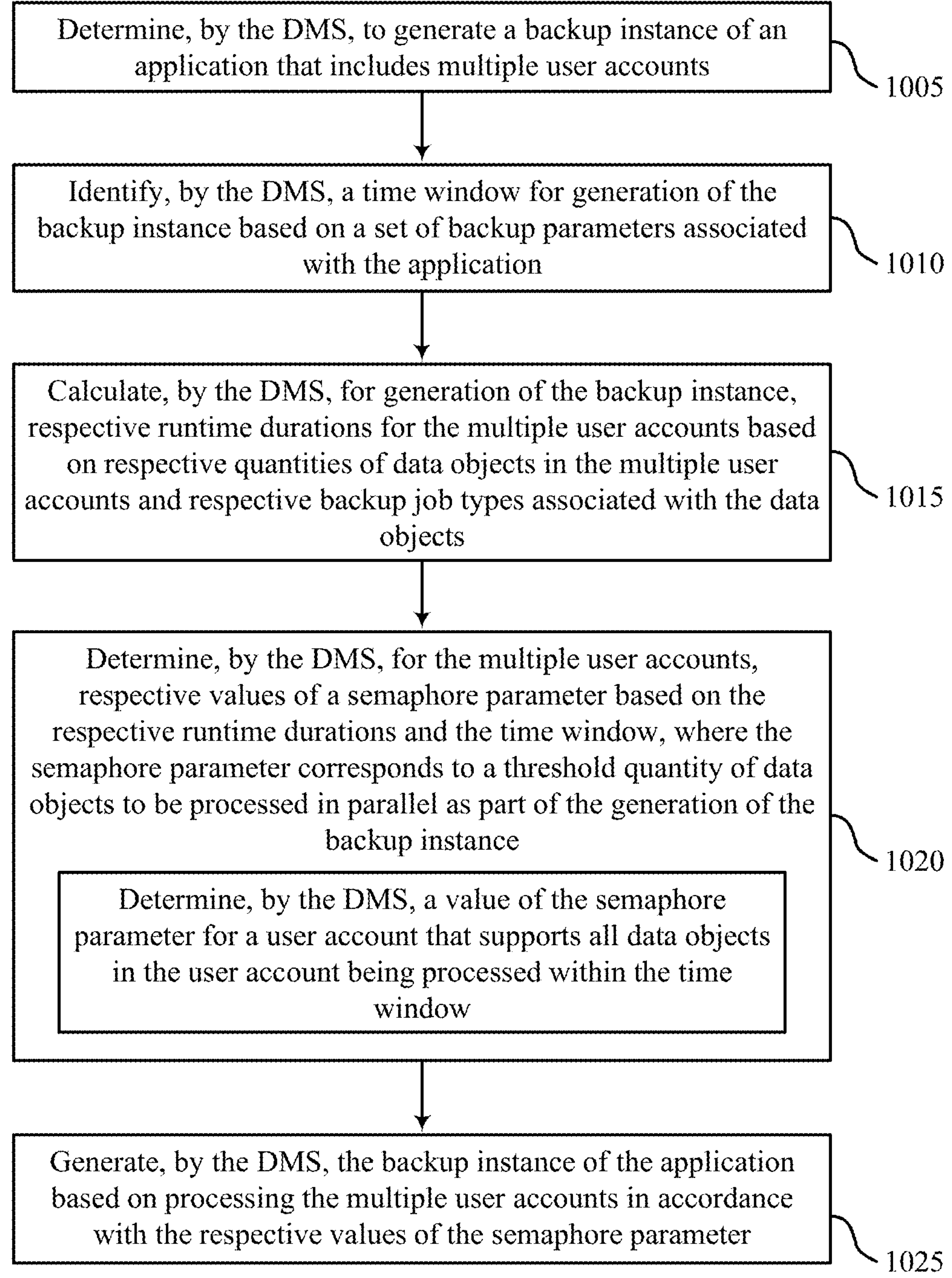

FIG. 10 shows a flowchart illustrating a method 1000 that supports dynamic resource scaling for large-scale backups in accordance with one or more aspects of the present disclosure. The operations of the method 1000 may be implemented by a DMS, or components thereof. For example, the operations of the method 1000 may be performed by a DMS 110, as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1005, the method may include determining, by the DMS, to generate a backup instance of an application that includes multiple user accounts. The operations of 1005 may be performed in accordance with examples disclosed herein. In some examples, aspects of the operations of 1005 may be performed by a backup determination component 625, as described with reference to FIG. 6.

At 1010, the method may include identifying, by the DMS, a time window for generation of the backup instance based on a set of backup parameters associated with the application. The operations of 1010 may be performed in accordance with examples disclosed herein. In some examples, aspects of the operations of 1010 may be performed by a time window component 630, as described with reference to FIG. 6.

At 1015, the method may include calculating, by the DMS, for generation of the backup instance, respective runtime durations for the multiple user accounts based on respective quantities of data objects in the multiple user accounts and respective backup job types associated with the data objects. The operations of 1015 may be performed in accordance with examples disclosed herein. In some examples, aspects of the operations of 1015 may be performed by a runtime duration component 635, as described with reference to FIG. 6.

At 1020, the method may include determining, by the DMS, for the multiple user accounts, respective values of a semaphore parameter based on the respective runtime durations and the time window, where the semaphore parameter corresponds to a threshold quantity of data objects to be processed in parallel as part of the generation of the backup instance. In some examples, the DMS may determine a value of the semaphore parameter for a user account that supports all data objects in the user account being processed within the time window. The operations of 1020 may be performed in accordance with examples disclosed herein. In some examples, aspects of the operations of 1020 may be performed by a semaphore parameter component 640, as described with reference to FIG. 6.

At 1025, the method may include generating, by the DMS, the backup instance of the application based on processing the multiple user accounts in accordance with the respective values of the semaphore parameter. The operations of 1025 may be performed in accordance with examples disclosed herein. In some examples, aspects of the operations of 1025 may be performed by a backup generation component 645, as described with reference to FIG. 6.

A method for data management is described. The method may include determining, by a DMS, to generate a backup instance of an application that includes multiple user accounts. The method may further include identifying, by the DMS, a time window for generation of the backup instance based on a set of backup parameters associated with the application. The method may further include calculating, by the DMS, for generation of the backup instance, respective runtime durations for the multiple user accounts based on respective quantities of data objects in the multiple user accounts and respective backup job types associated with the data objects. The method may further include determining, by the DMS, for the multiple user accounts, respective values of a semaphore parameter based on the respective runtime durations and the time window, where the semaphore parameter corresponds to a threshold quantity of data objects to be processed in parallel as part of the generation of the backup instance. The method may further include generating, by the DMS, the backup instance of the application based on processing the multiple user accounts in accordance with the respective values of the semaphore parameter.

An apparatus for data management is described. The apparatus may include a processor, memory coupled with the processor, and instructions stored in the memory. The instructions may be executable by the processor to cause the apparatus to determine, by a DMS, to generate a backup instance of an application that includes multiple user accounts. The instructions may be further executable by the processor to cause the apparatus to identify, by the DMS, a time window for generation of the backup instance based on a set of backup parameters associated with the application. The instructions may be further executable by the processor to cause the apparatus to calculate, by the DMS, for generation of the backup instance, respective runtime durations for the multiple user accounts based on respective quantities of data objects in the multiple user accounts and respective backup job types associated with the data objects. The instructions may be further executable by the processor to cause the apparatus to determine, by the DMS, for the multiple user accounts, respective values of a semaphore parameter based on the respective runtime durations and the time window, where the semaphore parameter corresponds to a threshold quantity of data objects to be processed in parallel as part of the generation of the backup instance. The instructions may be further executable by the processor to cause the apparatus to generate, by the DMS, the backup instance of the application based on processing the multiple user accounts in accordance with the respective values of the semaphore parameter.

Another apparatus for data management is described. The apparatus may include means for determining, by a DMS, to generate a backup instance of an application that includes multiple user accounts. The apparatus may further include means for identifying, by the DMS, a time window for generation of the backup instance based on a set of backup parameters associated with the application. The apparatus may further include means for calculating, by the DMS, for generation of the backup instance, respective runtime durations for the multiple user accounts based on respective quantities of data objects in the multiple user accounts and respective backup job types associated with the data objects. The apparatus may further include means for determining, by the DMS, for the multiple user accounts, respective values of a semaphore parameter based on the respective runtime durations and the time window, where the semaphore parameter corresponds to a threshold quantity of data objects to be processed in parallel as part of the generation of the backup instance. The apparatus may further include means for generating, by the DMS, the backup instance of the application based on processing the multiple user accounts in accordance with the respective values of the semaphore parameter.

A non-transitory computer-readable medium storing code for data management is described. The code may include instructions executable by a processor to determine, by a DMS, to generate a backup instance of an application that includes multiple user accounts. The instructions may be further executable by the processor to identify, by the DMS, a time window for generation of the backup instance based on a set of backup parameters associated with the application. The instructions may be further executable by the processor to calculate, by the DMS, for generation of the backup instance, respective runtime durations for the multiple user accounts based on respective quantities of data objects in the multiple user accounts and respective backup job types associated with the data objects. The instructions may be further executable by the processor to determine, by the DMS, for the multiple user accounts, respective values of a semaphore parameter based on the respective runtime durations and the time window, where the semaphore parameter corresponds to a threshold quantity of data objects to be processed in parallel as part of the generation of the backup instance. The instructions may be further executable by the processor to generate, by the DMS, the backup instance of the application based on processing the multiple user accounts in accordance with the respective values of the semaphore parameter.

In some examples of the methods, apparatuses, and non-transitory computer-readable media described herein, operations, features, means, or instructions for generating the backup instance of the application may include operations, features, means, or instructions for executing, by the DMS, one or more full backup jobs to generate full backups for a first set of data objects in a user account of the multiple user accounts and executing, by the DMS, one or more incremental backup jobs to generate incremental backups for a second set of data objects in the user account.

In some examples of the methods, apparatuses, and non-transitory computer-readable media described herein, the plurality of user accounts may be associated with a client of the data management system, and operations, features, means, or instructions for calculating the respective runtime durations for the multiple user accounts may include operations, features, means, or instructions for calculating, by the DMS, a runtime duration for the one or more full backup jobs based on an average runtime duration of previous full backup jobs associated with the client of the DMS.

In some examples of the methods, apparatuses, and non-transitory computer-readable media described herein, operations, features, means, or instructions for calculating the respective runtime durations for the multiple user accounts may include operations, features, means, or instructions for calculating, by the DMS, a runtime duration for the one or more incremental backup jobs based on an average runtime duration of previous incremental backup jobs associated with the application.

In some examples of the methods, apparatuses, and non-transitory computer-readable media described herein, operations, features, means, or instructions for calculating the respective runtime durations for the multiple user accounts may include operations, features, means, or instructions for calculating, by the DMS, a first runtime duration for the one or more full backup jobs and a second runtime duration for the one or more full backup jobs, where a runtime duration for the user account is based on a combination of (e.g., equal to or otherwise based on a sum of) the first runtime duration and the second runtime duration.

In some examples of the methods, apparatuses, and non-transitory computer-readable media described herein, operations, features, means, or instructions for determining the respective values for the semaphore parameter may include operations, features, means, or instructions for determining, by the DMS, a value of the semaphore parameter for a user account that supports all data objects in the user account being processed within the time window.

Some examples of the methods, apparatuses, and non-transitory computer-readable media described herein may further include operations, features, means, or instructions for updating, by the DMS, the respective values of the semaphore parameter according to a computational load of the DMS, a processing capacity of the DMS, a completion status of the backup instance, or any combination thereof.

In some examples of the methods, apparatuses, and non-transitory computer-readable media described herein, operations, features, means, or instructions for generating the backup instance of the application may include operations, features, means, or instructions for executing, by the DMS, one or more backup jobs to generate backups of the data objects in the multiple user accounts and storing, by the DMS, runtime information associated with the one or more backup jobs in association with the backup instance of the application.

In some examples of the methods, apparatuses, and non-transitory computer-readable media described herein, operations, features, means, or instructions for generating the backup instance of the application may include operations, features, means, or instructions for executing, by the DMS, an incremental backup job to generate an incremental backup of a data object in a user account of the multiple user accounts and executing, by the DMS, a full backup job to generate a full backup of the data object in response to detecting a failure associated with the incremental backup job.

Some examples of the methods, apparatuses, and non-transitory computer-readable media described herein may further include operations, features, means, or instructions for storing, by the DMS, information associated with the failure, where the respective values of the semaphore parameter are calculated based on the stored information associated with the failure.

In some examples of the methods, apparatuses, and non-transitory computer-readable media described herein, the failure may be an API failure, a network failure, a dependent service failure, or any combination thereof.

In some examples of the methods, apparatuses, and non-transitory computer-readable media described herein, operations, features, means, or instructions for generating the backup instance of the application may include operations, features, means, or instructions for executing, by the DMS, an incremental backup job to generate an incremental backup of a data object in a user account of the multiple user accounts, where operations, features, means, or instructions for executing the incremental backup job may include operations, features, means, or instructions for transmitting, to a data service that supports the application, an API request indicating a key associated with a prior full backup of the data object and receiving, from the data service, an API response indicating one or more changes made to the data object between a first time associated with generation of the prior full backup and a second time associated with transmission of the API request, where the incremental backup of the data object includes the one or more changes indicated by the API response.

In some examples of the methods, apparatuses, and non-transitory computer-readable media described herein, operations, features, means, or instructions for determining the respective values of the semaphore parameter may include operations, features, means, or instructions for determining, by the DMS, a buffer percentage for the semaphore parameter based on a failure tolerance of the DMS.

Some examples of the methods, apparatuses, and non-transitory computer-readable media described herein may further include operations, features, means, or instructions for increasing, by the DMS, a value of the semaphore parameter for a user account in response to detecting a backup job failure associated with the user account, where the value of the semaphore parameter for the user account is increased by a percentage that is less than or equal to the buffer percentage.

Some examples of the methods, apparatuses, and non-transitory computer-readable media described herein may further include operations, features, means, or instructions for determining the respective values of the semaphore parameter in accordance with a schedule that is based on a compliance status of the application.

In some examples of the methods, apparatuses, and non-transitory computer-readable media described herein, operations, features, means, or instructions for determining the respective values of the semaphore parameter may include operations, features, means, or instructions for reducing, by the DMS, a value of the semaphore parameter for a user account of the multiple user accounts after generating full backups of all data objects in the user account.

In some examples of the methods, apparatuses, and non-transitory computer-readable media described herein, the data objects may be emails, files, documents, account settings, contacts, or any combination thereof.

In some examples of the methods, apparatuses, and non-transitory computer-readable media described herein, the set of backup parameters may indicate the time window, a full backup policy for the application, an incremental backup policy for the application, a retention policy for the backup instance, an archival policy for the backup instance, a replication policy for the backup instance, or any combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:

identifying a time window for generation of a backup instance of a plurality of user accounts associated with an application;

calculating respective runtime durations associated with generation of the backup instance for the plurality of user accounts;

determining, for the plurality of user accounts, respective values of a semaphore parameter based at least in part on the respective runtime durations and the time window, wherein the semaphore parameter corresponds to a threshold quantity of backup processes to be performed in parallel as part of the generation of the backup instance; and generating, during the time window, the backup instance of the plurality of user accounts based at least in part on processing the plurality of user accounts in accordance with the respective values of the semaphore parameter.

2. The method of claim 1, wherein generating the backup instance of the plurality of user accounts comprises:

executing one or more full backup jobs to generate full backups for a first set of one or more data objects in a user account of the plurality of user accounts; and executing one or more incremental backup jobs to generate incremental backups for a second set of one or more data objects in the user account.

3. The method of claim 2, wherein the plurality of user accounts are associated with a client of a data management system, and wherein calculating the respective runtime durations for the plurality of user accounts comprises:

calculating a runtime duration for the one or more full backup jobs based at least in part on an average runtime duration of previous full backup jobs associated with the client of the data management system.

4. The method of claim 2, wherein calculating the respective runtime durations for the plurality of user accounts comprises:

calculating a runtime duration for the one or more incremental backup jobs based at least in part on an average runtime duration of previous incremental backup jobs associated with the application.

5. The method of claim 2, wherein calculating the respective runtime durations for the plurality of user accounts comprises:

calculating a first runtime duration for the one or more full backup jobs and a second runtime duration for the one or more full backup jobs, wherein a runtime duration for the user account is based at least in part on a combination of the first runtime duration and the second runtime duration.

6. The method of claim 1, wherein determining the respective values for the semaphore parameter comprises:

determining a value of the semaphore parameter for a user account that supports all data objects in the user account being processed within the time window.

7. The method of claim 1, further comprising:

updating the respective values of the semaphore parameter according to a computational load of a data management system, a processing capacity of the data management system, a completion status of the backup instance, or any combination thereof.

8. The method of claim 1, wherein generating the backup instance of the application comprises:

executing one or more backup jobs to generate backups of one or more data objects in the plurality of user accounts; and storing runtime information associated with the one or more backup jobs in association with the backup instance of the application.

9. The method of claim 1, wherein generating the backup instance of the application comprises:

executing an incremental backup job to generate an incremental backup of a data object in a user account of the plurality of user accounts; and executing a full backup job to generate a full backup of the data object in response to detecting a failure associated with the incremental backup job.

10. The method of claim 9, further comprising:

storing information associated with the failure, wherein the respective values of the semaphore parameter are calculated based at least in part on the stored information associated with the failure.

11. The method of claim 9, wherein the failure comprises an application programming interface (API) failure, a network failure, a dependent service failure, or any combination thereof.

12. The method of claim 1, wherein generating the backup instance of the application comprises:

executing an incremental backup job to generate an incremental backup of a data object in a user account of the plurality of user accounts, wherein executing the incremental backup job comprises:

transmitting an application programming interface (API) request indicating a key associated with a prior full backup of the data object; and receiving an API response indicating one or more changes made to the data object between a first time associated with generation of the prior full backup and a second time associated with transmission of the API request, wherein the incremental backup of the data object comprises the one or more changes indicated by the API response.

13. The method of claim 1, wherein determining the respective values of the semaphore parameter comprises:

determining a buffer percentage for the semaphore parameter based at least in part on a failure tolerance of a data management system.

14. The method of claim 13, further comprising:

increasing a value of the semaphore parameter for a user account in response to detecting a backup job failure associated with the user account, wherein the value of the semaphore parameter for the user account is increased by a percentage that is less than or equal to the buffer percentage.

15. The method of claim 1, wherein the respective values of the semaphore parameter are determined in accordance with a schedule that is based at least in part on a compliance status of the application.

16. The method of claim 1, wherein determining the respective values of the semaphore parameter comprises:

reducing a value of the semaphore parameter for a user account of the plurality of user accounts after generating full backups of all data objects in the user account.

17. The method of claim 1, wherein the plurality of user accounts comprise one or more data objects, and wherein the one or more data objects comprise emails, files, documents, account settings, contacts, or any combination thereof.

18. The method of claim 1, wherein generating the backup instance is based at least in part on a set of backup parameters, and wherein the set of backup parameters indicate the time window, a full backup policy for the application, an incremental backup policy for the application, a retention policy for the backup instance, an archival policy for the backup instance, a replication policy for the backup instance, or any combination thereof.

19. An apparatus, comprising:

one or more processors;

memory coupled with the one or more processors; and instructions stored in the memory and executable by the one or more processors to cause the apparatus to:

identify a time window for generation of a backup instance of a plurality of user accounts associated with an application;

calculate respective runtime durations associated with generation of the backup instance for the plurality of user accounts;

determine, for the plurality of user accounts, respective values of a semaphore parameter based at least in part on the respective runtime durations and the time window, wherein the semaphore parameter corresponds to a threshold quantity of backup processes to be performed in parallel as part of the generation of the backup instance; and generate, during the time window, the backup instance of the plurality of user accounts based at least in part on processing the plurality of user accounts in accordance with the respective values of the semaphore parameter.

20. A non-transitory computer-readable medium storing code for data management, the code comprising instructions executable by one or more processors to:

identify a time window for generation of a backup instance of a plurality of user accounts associated with an application;

calculate respective runtime durations associated with generation of the backup instance for the plurality of user accounts;

determine, for the plurality of user accounts, respective values of a semaphore parameter based at least in part on the respective runtime durations and the time window, wherein the semaphore parameter corresponds to a threshold quantity of backup processes to be performed in parallel as part of the generation of the backup instance; and generate, during the time window, the backup instance of the plurality of user accounts based at least in part on processing the plurality of user accounts in accordance with the respective values of the semaphore parameter.

* * * * *